(12) United States Patent
Verma et al.

(10) Patent No.: US 12,469,002 B2
(45) Date of Patent: Nov. 11, 2025

(54) APPARATUS FOR AUTOMATING INVENTORY AND AUTOMATIC INVENTORY SYSTEM AND METHOD

(71) Applicant: International Business Machines Corporation, Armonk, NY (US)

(72) Inventors: Dinesh C. Verma, New Castle, NY (US); Wayne B. Riley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 17/134,723

(22) Filed: Dec. 28, 2020

(65) Prior Publication Data

US 2022/0207462 A1   Jun. 30, 2022

(51) Int. Cl.
*G06Q 10/087* (2023.01)
*B25J 9/16* (2006.01)
(Continued)

(52) U.S. Cl.
CPC ............ *G06Q 10/087* (2013.01); *B25J 9/162* (2013.01); *B25J 13/08* (2013.01); *B25J 19/023* (2013.01);
(Continued)

(58) Field of Classification Search
CPC ......... G06Q 10/087; B25J 9/162; B25J 13/08; B25J 19/023; B25J 5/007; B65G 1/02;
(Continued)

(56) References Cited

U.S. PATENT DOCUMENTS

| 6,584,375 | B2 | 6/2003 | Bancroft et al. |
| 7,693,757 | B2 | 4/2010 | Zimmerman |

(Continued)

FOREIGN PATENT DOCUMENTS

| CN | 109598474 A | 4/2019 |
| CN | 110070107 A | 7/2019 |

(Continued)

OTHER PUBLICATIONS

International Search Report and Written Opinion dated Feb. 9, 2022 from related PCT/CN2021/126395.
(Continued)

*Primary Examiner* — Florian M Zeender
*Assistant Examiner* — Kimberly S. Bursum
(74) *Attorney, Agent, or Firm* — Scully, Scott, Murphy & Presser, PC; Michael A. Petrocelli, Esq.

(57) ABSTRACT

An apparatus for automating inventory procedures for items stored on shelves in a closed environment includes a mobile mechanical device having a movable appendage including a camera and additional sensory modalities. The camera and additional sensory modalities are used to position the movable appendage to take camera images of the items on the shelves from many different perspectives. Camera vision and the additional sensory modalities can be used to rotate, lower and raise movable appendage to position the appendage over and along the sides of the items on the shelf. The context of the mobile mechanical device is determined and edge AI computing retrieves AI context specific models based on the context. The AI context specific models may be downloaded from a cloud service. The edge AI computing uses the AI context specific models to identify and count the items on the shelf.

18 Claims, 11 Drawing Sheets

(51) Int. Cl.
  *B25J 13/08* (2006.01)
  *B25J 19/02* (2006.01)
  *B65G 1/02* (2006.01)
  *G06N 20/00* (2019.01)
  *G06V 20/10* (2022.01)
  *H04N 23/695* (2023.01)

(52) U.S. Cl.
  CPC .............. *B65G 1/02* (2013.01); *G06N 20/00* (2019.01); *G06V 20/10* (2022.01); *H04N 23/695* (2023.01)

(58) Field of Classification Search
  CPC ........ G06N 20/00; G06V 20/10; G06V 20/52; H04N 23/695; H04N 23/90
  See application file for complete search history.

(56) References Cited

U.S. PATENT DOCUMENTS

| | | | |
|---|---|---|---|
| 9,463,574 | B2 | 10/2016 | Purkayastha et al. |
| 9,626,609 | B1 | 4/2017 | Ferguson |
| 10,204,313 | B2 | 2/2019 | Stevens et al. |
| 10,452,924 | B2 | 10/2019 | Adato et al. |
| 10,474,858 | B2 | 11/2019 | David et al. |
| 10,565,548 | B2 | 2/2020 | Skaff et al. |
| 2014/0288952 | A1 | 9/2014 | Smith et al. |
| 2015/0046299 | A1 | 2/2015 | Yan |
| 2017/0255899 | A1 | 9/2017 | Taira et al. |
| 2017/0286901 | A1 | 10/2017 | Skaff et al. |
| 2018/0005173 | A1 | 1/2018 | Elazary et al. |
| 2018/0005176 | A1 | 1/2018 | Williams et al. |
| 2019/0012592 | A1 | 1/2019 | Beser et al. |
| 2019/0215424 | A1* | 7/2019 | Adato ................. G06T 7/55 |
| 2019/0236531 | A1* | 8/2019 | Adato ................. H04N 23/80 |
| 2020/0061839 | A1* | 2/2020 | Deyle ................. G06Q 10/087 |
| 2020/0074402 | A1* | 3/2020 | Adato ................. G06V 20/52 |
| 2020/0218937 | A1 | 7/2020 | Visentini Scarzanella et al. |
| 2020/0286032 | A1* | 9/2020 | Bogolea ............. G05D 1/0282 |
| 2021/0312206 | A1* | 10/2021 | Meidar ................. G06V 20/20 |
| 2021/0374836 | A1* | 12/2021 | Bronicki ............ G06Q 30/0623 |
| 2021/0400195 | A1* | 12/2021 | Adato ................. G06Q 30/0201 |
| 2022/0012533 | A1 | 1/2022 | Yue et al. |
| 2022/0122493 | A1* | 4/2022 | Adato ................. G09F 3/208 |
| 2022/0157063 | A1* | 5/2022 | Bronicki ............ G06V 40/20 |
| 2023/0421705 | A1* | 12/2023 | Bogolea ............. G05D 1/225 |

FOREIGN PATENT DOCUMENTS

| | | |
|---|---|---|
| WO | 2013/071150 A1 | 5/2013 |
| WO | 2019/140091 A1 | 7/2019 |
| WO | 2020/192736 A1 | 10/2020 |

OTHER PUBLICATIONS

Mell et al., "The NIST Definition of Cloud Computing", Sep. 2011, pp. 1-7, Special Publication 800-145, National Institute of Standards and Technology.

Australian Examination Report dated Jan. 15, 2024 issued in related application AU 2021415837.

Extended European Search Report dated May 22, 2024 from related EP 21913389.9.

Haddadpour et al., "On the convergence of local descent methods in federated learning", arXiv:1910. 14425v2, Dec. 6, 2019, 49 pages.

Hardy et al., "Private federated learning on vertically partitioned data via entity resolution and additively homomorphic encryption", Machine learning, arXiv:1711.10677v1, Nov. 29, 2017, 60 pages.

Verma et al. "Federated Learning for Coalition Operations", arXiv:1910.06799v1, Oct. 14, 2019, 08 pages.

Verma et al., "Federated AI for the Enterprise: A Web Services based Implementation", IEEE International Conference on Web Services (ICWS), 2019, pp. 20-27, doi: 10.1109/ICWS.2019.00016.

Wu et al., "Galaxy Learning—a Position Paper", arXiv:1905.00753v1, Apr. 22, 2019, 08 pages.

Yang et al., "Federated Machine Learning: Concept and Applications", arXiv:1902.04885v1, Feb. 13, 2019, 09 pages.

Response filed on Sep. 19, 2024 in related Australian application AU 2021415837.

* cited by examiner

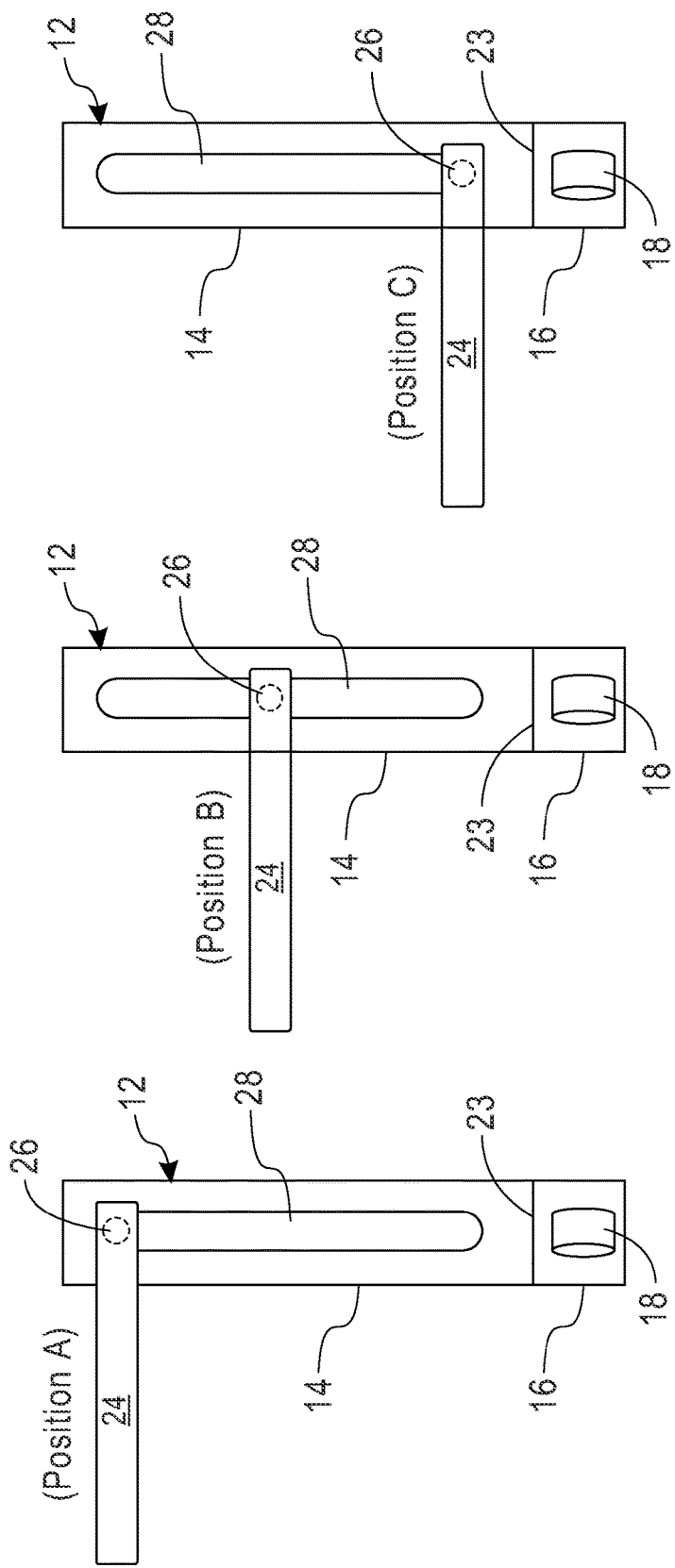
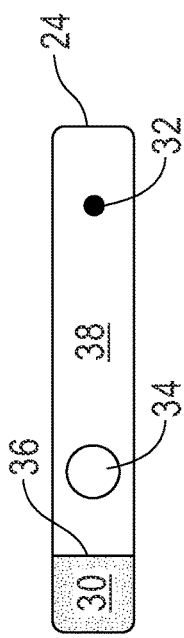
FIG. 2
FIG. 3

APPARATUS FOR AUTOMATING INVENTORY AND AUTOMATIC INVENTORY SYSTEM AND METHOD

BACKGROUND OF THE INVENTION

This disclosure is directed to computers, and computer applications, and more particularly to computer-implemented methods and systems of inventory control, and in particular to performing inventory tasks using a robot.

There are systems available that keep track of inventory of products in a store, typically maintaining counts of a specific product Stock keeping unit (SKU). The count of different items is maintained in a database, which can also store other attributes of the product. However, there is a frequent need to compare the count of items stored in the inventory with the physical counts of the objects in the store. This process of cross-checking the physical inventory with the logical inventory stored in a database is manual and time consuming.

There are existing tools that automate the counting of objects of different types. For example, there are applications on a mobile phone which can be used to scan tags and labels on physical objects and store them into an inventory system. However, because these applications require manual operation to cover the physical premises, they are time consuming and costly.

There are approaches available that have a robot use cameras to scan objects that are present externally or to fly a drone or use satellite images to take pictures of containers outside. These are useful and applicable when the items to be counted can be seen distinctly from the vantage point of a camera. However, there are many cases where the camera vantage point is obstructed from a complete view of the image. As an example, a satellite cannot estimate easily how many containers are stacked on top of each other. Cameras that operate using visible electromagnetic spectrum are blocked by non-transparent objects, while cameras that operate in ultraviolet electromagnetic spectrum may be blocked partially by some objects depending on their position.

There are numerous problems to overcome when attempting to take the inventory in an enclosed space, using either a static camera or a mobile camera. For example, in a grocery store, there will be obstructions of the view for many objects. The camera of a moving robot (or a static camera at a point) will be able to see the first object in the shelf, but would not be able to see the objects which are behind the first object in the same shelf. This precludes it from the ability to count the items automatically.

Stores do deploy robots of many types, which can be attached with motor assembly and cameras. The robot may have a camera or other sensors, and is capable of moving around the store. However, even though the robot is good for some tasks such as detecting spills in the aisle, or making other types of visual observations, the state of the art robots cannot overcome the problem caused by an obstructed view of products on the shelf and therefore cannot perform a good job at counting the inventory of different items in the stock.

Given these challenges, there is no good way to currently take a good inventory of physical assets in an enclosed space which can easily count objects that are small or typically positioned in a manner such that their view is obstructed from any type of camera, static or mobile.

SUMMARY OF THE INVENTION

One embodiment, an apparatus for automating inventory procedures for items stored on shelves in a closed environment includes a mobile mechanical device having at least one movable appendage, the at least one movable appendage including at least one camera and at least one additional sensory modality. The apparatus includes a control module using the at least one camera and at least one additional sensory modality to position the at least one movable appendage to take camera images of the items on the shelves in the closed environment from many different perspectives and an edge AI computing module. The edge AI computing module uses context information to dynamically retrieve AI context specific models based on the context. The edge AI computing module uses the AI context specific models to identify and count the items on the shelf. In one embodiment, the control module uses camera vision and the at least one additional sensory modality to position the appendage over and along the sides of the items on the shelf. In one embodiment, the AI context specific models are downloaded from a cloud hosting service. In one embodiment, an AI context model is used to determine the context of the mobile mechanical device. In one embodiment, the movable appendage can be rotated about its longitudinal axis and lowered and raised along a vertical dimensional of the mobile mechanical device. In one embodiment, the item count is uploaded to an inventory management system.

One embodiment of a computer implemented method for automating inventory procedures for items stored on shelves in a closed environment includes providing a mobile mechanical device with movable appendage having sensory modalities, including a camera, controlling the sensory modalities to position the appendage to image items from many different perspectives, determining the context of the mobile mechanical device, retrieving AI context specific models based on the context and using the AI context specific models to identify and count the items. In some embodiments, the method may also include positioning the appendage over and along the sides of the items, downloading AI context specific models from a cloud service, determining the context of the mobile mechanical device using an AI context model, rotating the appendage about a longitudinal axis, lowering and raising the appendage along a vertical dimensional of the mobile mechanical device and uploading the item count to an inventory management system.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is a schematic illustration of one embodiment showing appendage positions of a mobile robot of an automatic inventory counting system in disclosed in this specification.

FIG. 3 is a schematic illustration of one embodiment of an appendage of a mobile robot of an automatic inventory counting system disclosed in this specification.

DETAILED DESCRIPTION OF PREFERRED EMBODIMENTS

Figure 1:
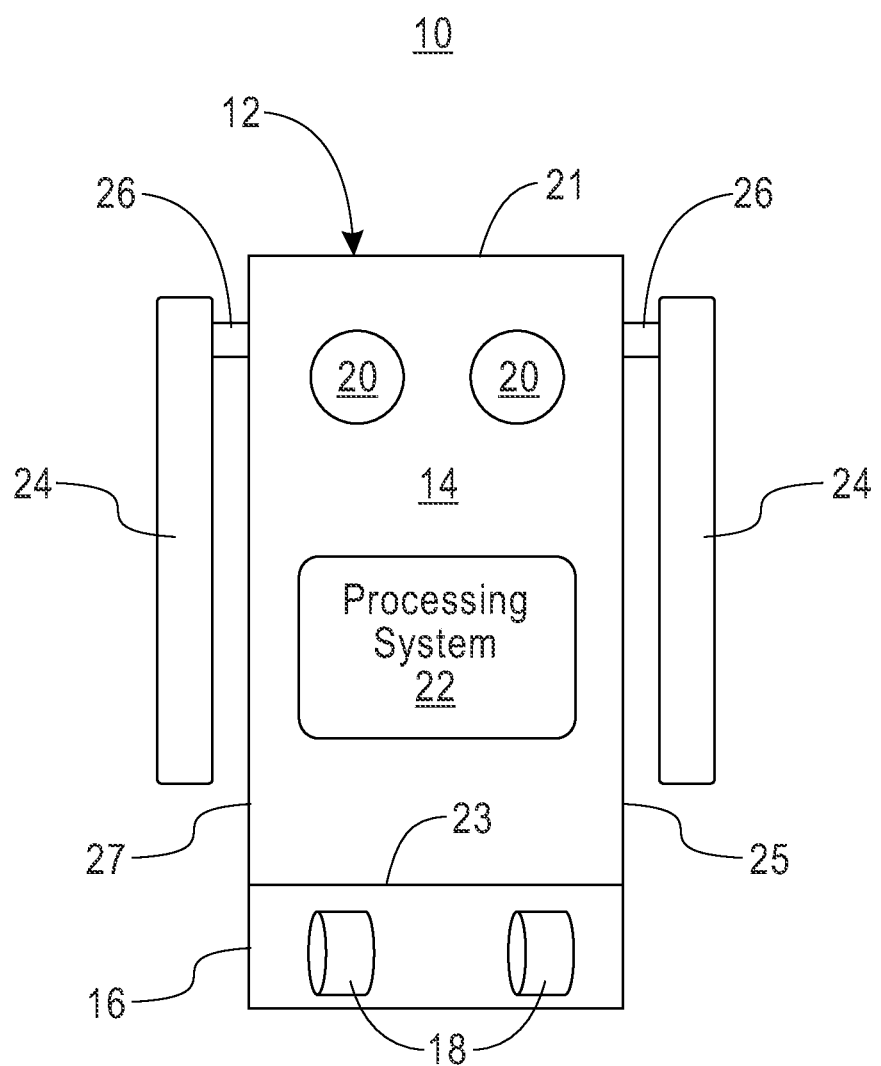
FIG. 1 is a schematic illustration of one embodiment of an automatic inventory counting system disclosed in this specification.

In a closed environment such as a retail store, warehouse or order fulfillment center, there are multiple racks, each rack consisting of multiple shelves on which different items are stacked. The environment will typically have several aisles, each aisle having a set of shelves on which items are stacked one behind the other. As a result, a human or machine assigned the task of taking an inventory of the items, when looking at the shelf and products would only see the product in front, or at most the first few products stacked on the shelf. The inventory taker or machine that relies on vision alone would not be able to see or count the products that are located deep behind the first object and therefore would be unable to determine how many products are on the shelf.

In one embodiment, an apparatus and system that automates the physical inventory of items that are stored in a closed environment and overcomes the problem of products being obstructed from view, is disclosed. In one embodiment, a mobile mechanical device, such a robot, that can move around in an enclosed space is provided with at least one camera mounted on at least one appendage. In one embodiment, the at least one appendage is also equipped with one additional sensory modality, such as a microphone, a touch sensor and/or a weight sensor. In one embodiment, the mobile robot uses camera vision, the additional sensory modalities and location information to position the robot in different locations and at different angles and to position the cameras on the appendage so the robot can view and count all the objects on the shelf. The modalities may also include lasers, LiDAR, structured light (active stereo) sensors, passive stereo sensors, scanners, infrared sensors, acoustic sensors, radio beacon receivers, or some combination thereof.

The use of multiple modalities allows the robot appendage to position itself properly and adjust the position of the cameras and other sensors to take an accurate count of all the objects on the shelf. The microphone and touch sensors are used to position the appendages with the camera into different positions to avoid the problem of items being occluded from vision. In one example, the robot can use sound and touch to move and position the camera deep within the shelf and move the appendage over and along the sides of the items so as to get a view of an object from multiple vantage points. From these vantage points, the robot can accurately count the number of items that are present within the shelf, thereby automatically taking a physical inventory. As a result, the apparatus and system has the ability to easily populate an inventory management system, as well as compare the physical and logical inventory.

In one embodiment, the robot includes a computer processing system that analyzes the images and the information obtained from the other modalities to count the items. In one embodiment, the computer processing system uses artificial intelligence (AI) programs, such as various machine learning and deep learning programs. In order to accurately count the many types of items in an environment such as store, warehouse or fulfillment center many different types of AI models are required to perform the analysis and counting. These AI models should be product specific, since each product has a different image and a different type of box. Having a single AI model that can detect and count all types of products would be extremely complex to design and with large number of objects, the error rate would become very high.

In order to address this problem, in one embodiment, the robot computer processing system is configured as an edge-AI computing system. In an edge-AI computing system, all the models for counting and detecting products are stored in a cloud hosted service, or a central service, but all the computations using the models is done by the processing system of robot 12. The central service for AI model hosting has the map/floor plan of the store and can determine what types of products are stored in each aisle location. Using its position in the store floor plan, and knowing which types of products are stored in each aisle, the processing system of the robot determines a context for its operation. Then, based on the determined context, the robot processing system downloads the right AI context specific models for counting and detecting the products that are stored in that aisle. Once the robot moves to a different aisle, or the context changes (e.g. set of products changes half-way through an aisle), the processing system 22 uses the new context to retrieve the correct set of AI models.

In one embodiment, as shown in FIG. 1, an automatic inventory counting system 10 includes robot 12. FIG. 1 is a front upright view of the robot 12. The robot 12 has a main body 14 and a mobile drive portion 16 that enables the robot 12 to travel around the environment, to each of the aisles, up and down the aisles and face shelves on either side of the aisles. In one embodiment, the mobile drive portion 16 has omni-directional wheels 18. In one embodiment, the main body 14 may include at least one camera 20. The embodiment shown in FIG. 1 has two cameras 20 in the main body 14. The robot 12 may also include a computer processing system 22 configured to control movements of the robot and perform data processing in connection with automatically taking a physical inventory. One example of such computer processing system is disclosed in FIG. 8, described below.

In one embodiment, the robot 12 has at least one movable appendage 24. The embodiment shown in FIG. 1 has two appendages 24 attached to in the main body 14. In one embodiment, the appendages 24 can be positioned to be rotated with respect to the main body 14. In one embodiment, each appendage 24 is attached to the main body 14 by a rotatable connection 26. The appendages 24 are shown in the travel position parallel to the sides of the main body 14. In one embodiment, the rotatable connection 26 may also be foldable so that the appendages 24 can be folded inward to be pressed against the sides 25 and 27 of the main body 14 to minimize its width foot-print, allowing the robot 12 to easily navigate into the aisles as needed.

In one embodiment, the appendages 24 may be lowered or raised to different positions between the top 21 and the bottom 23 of the main body 14. In one embodiment, the rotatable connection 26 may be slidable along the sides 25 and 27 of the main body 14. Three different working positions of the appendages 24 are shown in FIG. 2. In Position A, the connection 26 is located near the top of the main body 14 and the appendage 24 is rotated 90° from the travel position. In Position B, the appendage 24 is moved along a track 28 to a position midway between the top 21 and a bottom 23 of the main body 14. In Position C, the appendage 24 is moved along the track 28 to a position within the track 28 near the bottom 23 of the main body 14.

As shown in FIG. 3, in one embodiment, each appendage 24 may include a touch sensor 30, a microphone 32 and an appendage camera 34. The touch sensor 30 is shown located on the end 36 of the appendage 24 that would be located furthest from the robot main body after the appendage 24 is rotated 90° from the travel position. In one embodiment, the appendage 24 may include a gripping mechanism and weight sensor to pick up items and use weight to count the number of items. The microphone 32 and the appendage camera 34 are exposed on surface 38 of appendage 24 that would face downward toward the floor after the appendage 24 is rotated 90° from the travel position.

Figure 4:
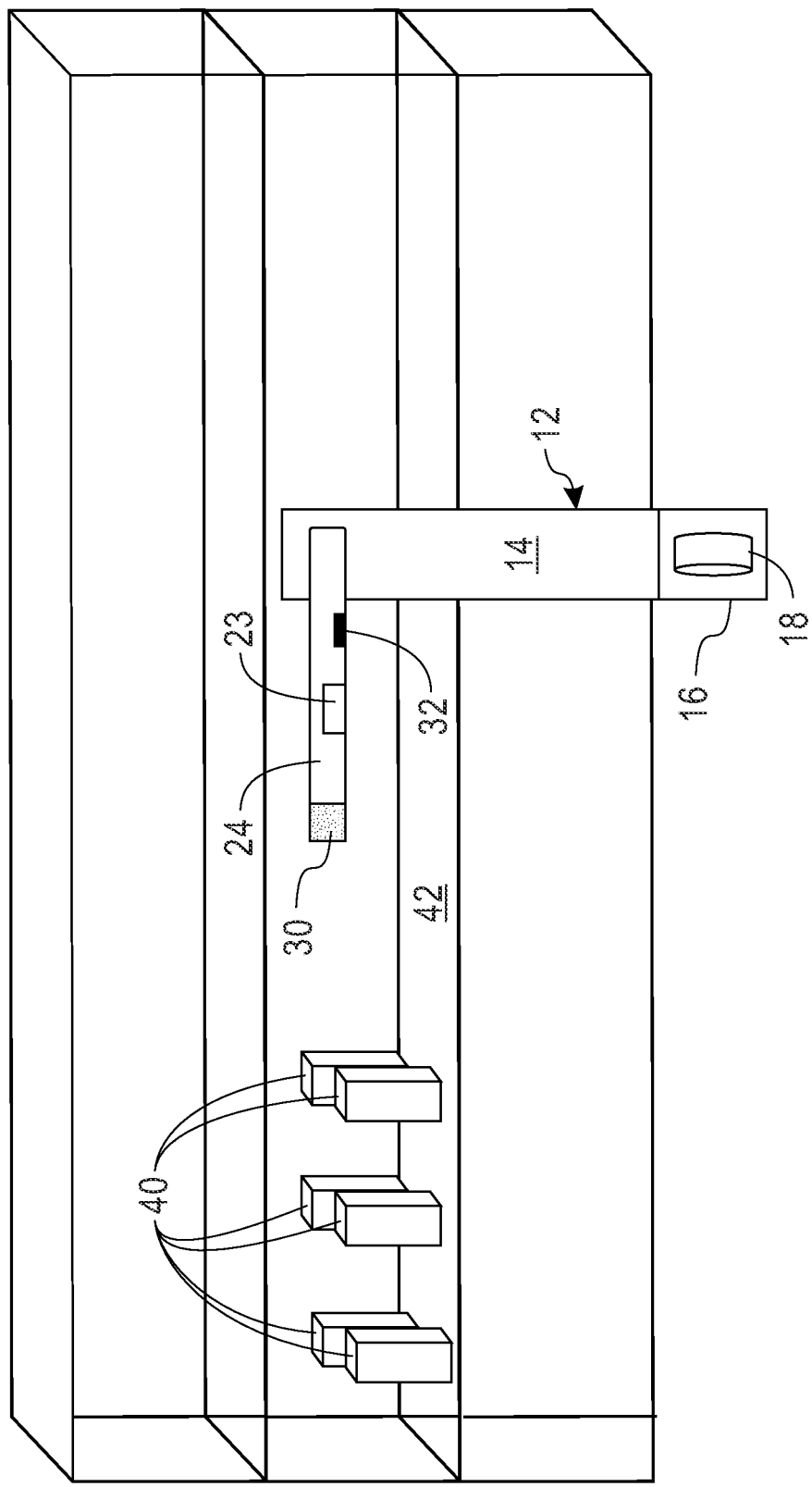
FIG. 4 is a schematic illustration of one embodiment of an automatic inventory counting system in an environment disclosed in this specification.

In order to take a physical inventory of items on the shelves of a closed environment, the robot 12 will move up down each of the aisles according to the floor plan of the environment controlled by a navigation program installed on the processing system 22. As the robot 12 positions itself into the front of the shelves in each of the aisles, robot 12 would raise its appendages 24 and move the appendages inside the shelf. For example, as shown in FIG. 4, the appendages 24 will be positioned over the top of the items 40 stacked one behind the other on self 42. The appendages 24 are positioned on the top of the items 40 so that the camera 34 is facing the top of the items 40 to allow the camera 34 to obtain digital images of the items 40 that can analyzed to count the items 40. In one embodiment, one or more of the appendages 24 could also be positioned in between two rows of items on the shelf. The appendage is then rotated about its longitudinal axis so that the modality sensors, camera 34 and microphone 32, are facing the side of the items, to allow the camera 34 to obtain digital images of the side of items 40. In order to deal with different sized objects in the shelf, the appendages 24 can be raised or lowered as the robot 12 moves down the aisle. Based on signals obtained from touch sensor 30, the robot 12 can determine that the appendage 24 is touching or has hit an obstruction. Sound captured by microphone 32 may be analyzed to determine of the appendage 24 touching or has hit an obstruction. For example, based on signals from touch sensor 24, the robot 12 can determine that the appendage 24 has reached the back of the shelf. The robot can then rotate the appendage 180° in order to obtain images of the items in the other side of the row as the robot 12 retracts from the back of the shelf. The sound signals from microphone 32 and the touch signals from touch sensor 30 can also be used to control the robot to avoid touching or dragging any items on the shelf. In alternative embodiment, LIDAR base sensing can be used to determine when the appendage has reached the back of the shelf.

The robot 12 analyzes the images taken from the camera 34 in the appendage 24 and the camera 20 in the front in the main body 14 to determine the type of products and to count the products. This counting can be done by running image processing algorithms on the images. Other approaches to count the items or measure their quantity can also be used. The touch sensor 30, for example, can be used to count a spring-loaded stack of items by using pressure on the touch sensor to count the number of items. When the touch sensor 30 includes a weight sensor on the appendage, the appendage picks up the items and uses weight to count the number of items. The robot 12 then moves to another position within the aisle or to the next aisle to count another set of objects.

Figure 5:
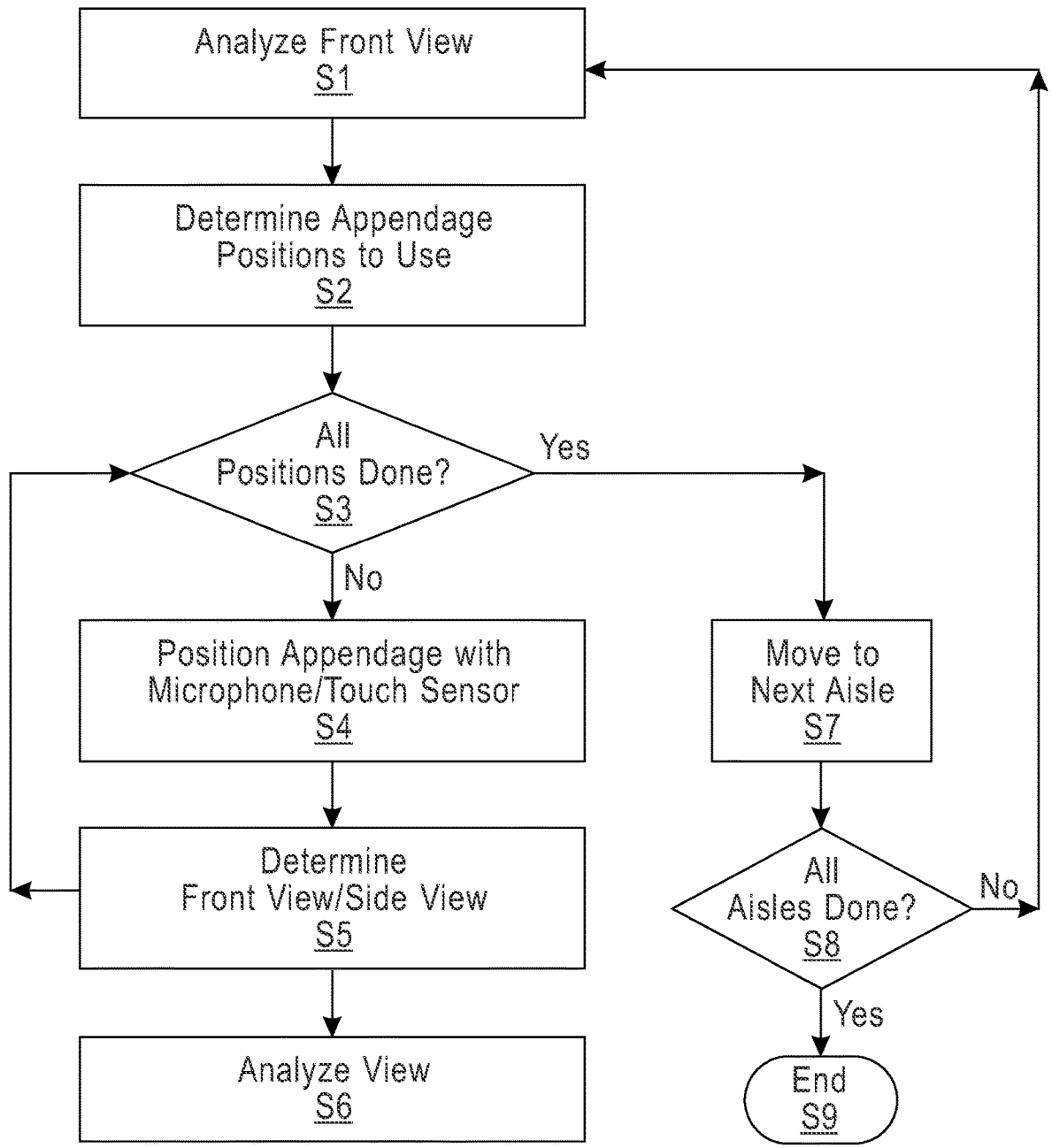
FIG. 5 is a flow diagram of one embodiment of the method disclosed in this specification.

FIG. 5 is a flowchart for one embodiment of the processing system 22 controlling the robot 12 to move around the store aisles and count all of the products on the shelves. In step S1, after the robot 12 has been controlled according to a navigation program to move to a particular aisle, the robot 12 obtains images from the camera 20 in the main body 14 and the processing system 22 then analyzes the view of the aisle from the front of the robot 12. In step S2, based on the type of products in the aisle as determined from the stored floor plan and from the signals obtained from the cameras 20, the processing system 22 determines which positions to use for the appendages 24 to count the items in that particular aisle. In step S3, the system checks if all the appendage positions determined in step S2 have been analyzed. If the determination in step S3 is NO, the method moves to step S4. In step S4, the appendages 24 are activated and moved to a first position within the shelf using the various modalities on the appendages 24, including the touch sensor 30, and microphone 32, to position the camera 34 to be able to obtain images of the items on the shelf. In step S5, the processing system 22 determines the views that the robot 12 and appendage 24 are detecting. In one embodiment, in step S5, the processing system 22 controls the cameras and obtains images from both the front view cameras 20 and the appendage camera 34. The processing system 22 determines whether the appendage camera 34 is positioned to view a side view of the items or a top view of the items. The processing system controls the camera 34 to obtain images of the items. The obtain images are then analyzed in step S6 to obtain a count of the items on the self at that particular appendage position. The item count is then transferred to an inventory management system to update the information in the inventory management system.

After the images are obtained in step S5 at the particular appendage position, the method also reverts back to step S3 to determine of images have been obtained at all the positions determined in step S2. If all positions are not completed, as noted above, the process repeats steps S4 to step S6 until all of the appendage positions in that first aisle are completed. When it is determined in step S3 that all appendage positions in that first aisle are completed, the process moves to step S7 in which the robot 12 is moved to the next aisle. In step S8 the system determines whether all the aisles have completed. If all aisles have been completed, S7 NO, the method reverts back to step S1 and steps S1 to S8 are repeated until all the aisles are completed. If all aisles are completed in step S8, the method ends in step S9.

The analysis of images to count the items in step S6 requires the use of artificial intelligence (AI) programs. There are many types of items in an environment such as store, warehouse or fulfillment center. In order to create a good counting model and to identify products, the robot 12 needs many different types of AI models to perform the analysis and counting. These AI models would be product specific, since each product has a different image and a different type of box. Having a single AI model that can detect and count all types of products would be extremely complex to design and with large number of objects, the error rate would become very high.

In order to address this problem, in one embodiment, the processing system 22 is configured as an edge-AI computing system. Edge Computing is a distributed computing paradigm that brings computation and data storage closer to the devices, such the processing system 22 of the robot 12 where it is being gathered. Compared to relying on a central location like a cloud, Edge Computing allows real-time data to not suffer bandwidth and latency issues which affect app performance. By bringing computation to a network edge, long-distance communication between a client and server is now being reduced. Edge AI computing is running the AI algorithms locally on a hardware device using edge computing where the AI algorithms are based on the data that are created on the device without requiring any connection. This allows the data to be processed in less than a few milliseconds which gives the user real-time information. AI processing uses deep learning models and with Edge AI computing, data can be curated before sending it off to a remote location for further analysis.

In one embodiment of an edge-AI computing system, all the models for counting and detecting products are stored in a cloud hosted service, or a central service but all the computations using the models is done by the processing system 22 of robot 12. The central service for AI model hosting has the map/floor plan of the store and can determine what types of products are stored in each aisle location. Using its position in the store floor plan, and knowing which types of products are stored in each aisle, the processing system 22 of the robot 12 determines a context for its operation. Then, based on the determined context, the robot processing system 22 downloads the right AI models for counting and detecting the products that are stored in that aisle. Once the robot moves to a different aisle, or the context changes (e.g. set of products changes half-way through an aisle), the processing system 22 uses the new context to retrieve the correct set of AI models.

Figure 6:
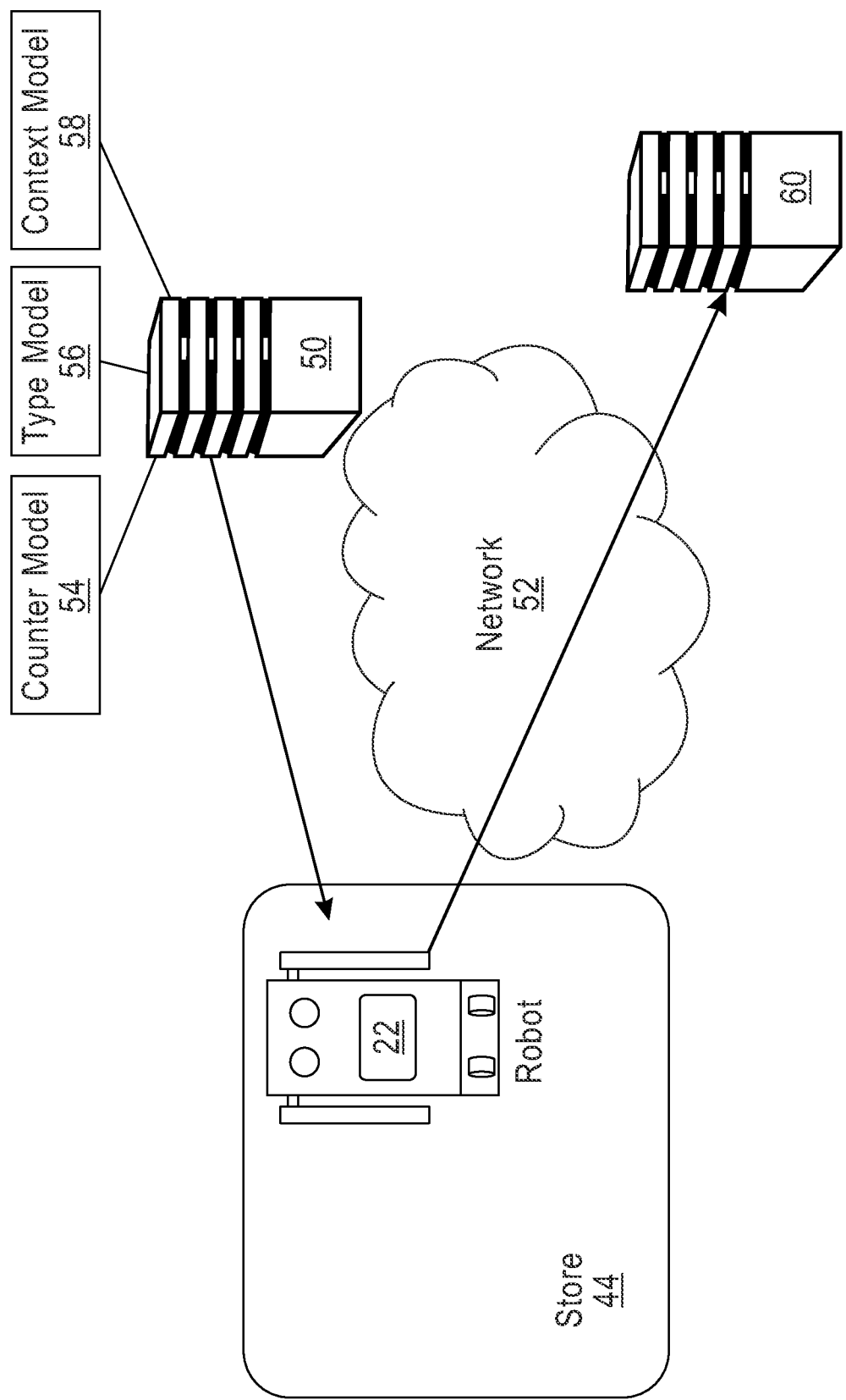
FIG. 6 is a schematic illustration of one embodiment of an automatic inventory counting system disclosed in this specification.

A representation of a cloud hosted system is shown in FIG. 6. The processing system 22 of robot 12 communicates with an AI Model Service 50 over a communications network 52, such as, for example, a local area network, a wide area network, the Internet, the cloud. The AI Model Service 50 includes one or more counter models 54, one or more type models 56 and one or more context models 58. The processing system 22 of robot 12 also communicates with a central inventory management service 60 over the communications network 52.

Figure 7:
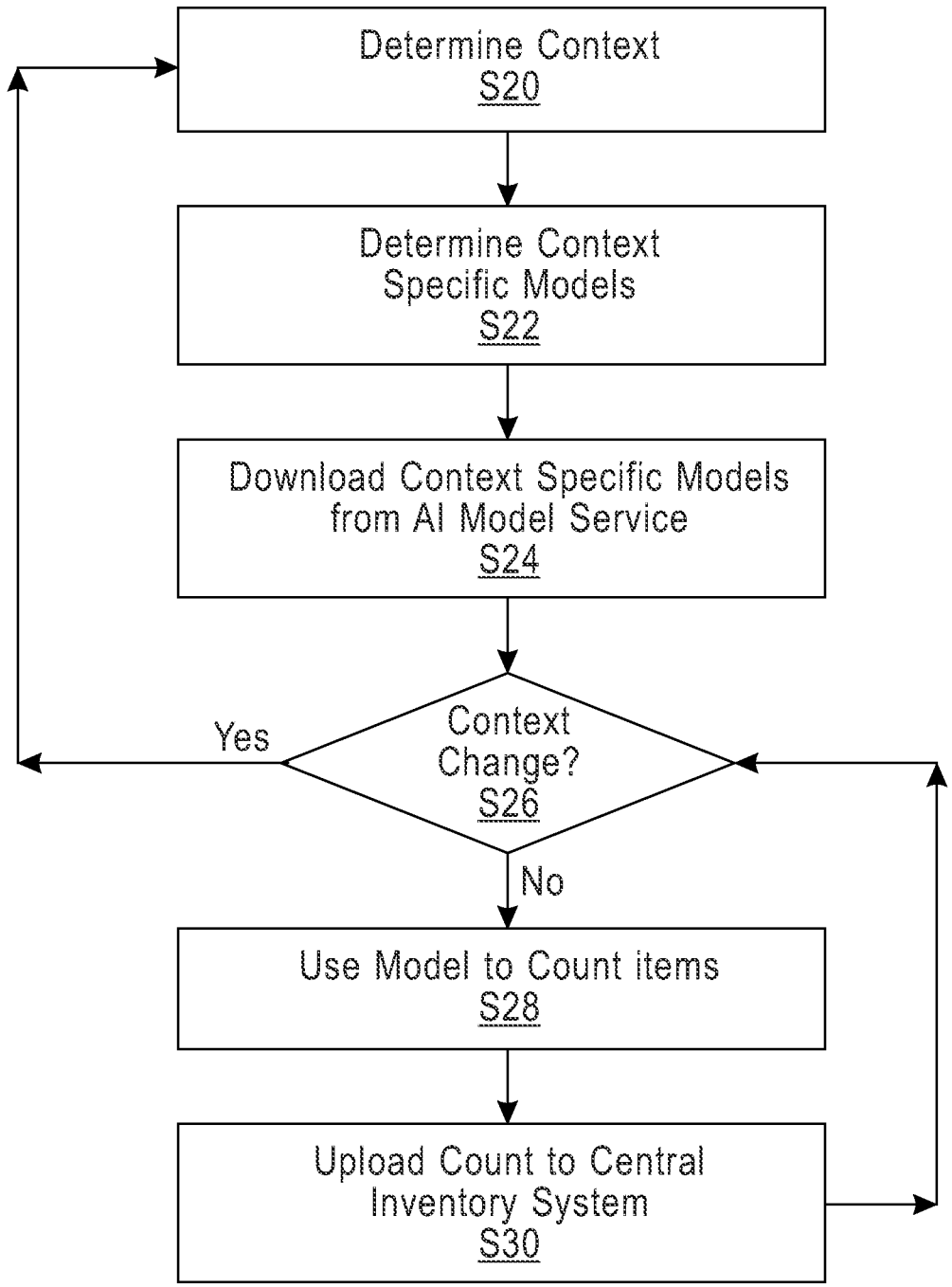
FIG. 7 is a flow diagram of one embodiment of the method disclosed in this specification.

FIG. 7 is a flow chart for one embodiment of the operation of a context specific AI model retrieval system that allows the robot 12 to do more accurate counting. In step S20, the context of the robot 12 is determined. In one embodiment, the processing system 22 determines a context for its operation based on the robot's position in the store floor plan and which types of products are stored in each aisle. In one embodiment, the context is determined by user input. In one embodiment, the processing system 22 downloads a context model 58 from the AI Model Service 50 that will be used to predict the context of the robot 12. The context model determines what the context of the robot is. The context model takes inputs such as the location of the robot, and its direction (e.g. which racks it is looking at) and it will predict the context. The context may also include a list of modalities the robot may want to use (e.g. use vision and weight sensors, or only use one of them). There can be more than one context, and there can be more than one context models. For example, when the robot is in the gaming section of the store, it may want to use a different model to predict its context, and when it is in the grocery section, it may use a different context model.

In step S22, the processing system 22 determines the context specific models to be downloaded from the AI model service 50 based on the context. In one embodiment, the context model 58 determines the AI type models and/or the AI counter models the robot would need to count the items. The context specific models may include a type model 56 and a counter model 54. In one embodiment, based on the context determined in step S20, including the location of the robot 12 in the store 44 and the types of products that are supposed to be counted on the shelf at that specific location, the processing system 22 selects the proper type model 56 for predicting the type of product to be counted. The type model predicts the type of product (e.g. SKU number) based on sensor inputs, such as camera 34. In some embodiments, there can be multiple type models 56, e.g. one determining the type based on a vision algorithm to recognize boxes, one determining the type based on a vision algorithm optimized for shapes of canisters, etc. The type model 56 to be used is determined by the context predicted by the context model 58. The counter model downloaded n step S22 is based on the type of product to be counted, either determined by the context model 58 or by the type model 56. For example, if the context of the robot 12 is that it is in aisle 10 of a store and that aisle 10 contains over the counter pain medicine, the robot 12 will download AI counter models 54 that can count the bottles of pain medicines. If the context of robot 12 is that it is in aisle 20 of a store and that aisle 20 contains boxes of pop-corn, the robot 12 will download AI counter models that can distinguish different types of pop-corn boxes and count them.

In step S26, the processing system 22 determines whether the context determined in step S20 has changed. If the context has not changed, NO at step S26, the method moves to step S28.

In step S28, the processing system 22 uses the downloaded count models to count the items.

In step S30, the processing system 22 uploads the item count to the central inventory management service 60. After the upload, the method reverts to step S26 to checks to see if the context of the robot 12 has changed. If the context has changed, YES at step S26, that will be an indication further items are to be counted and the method reverts back to step S20.

Figure 8:
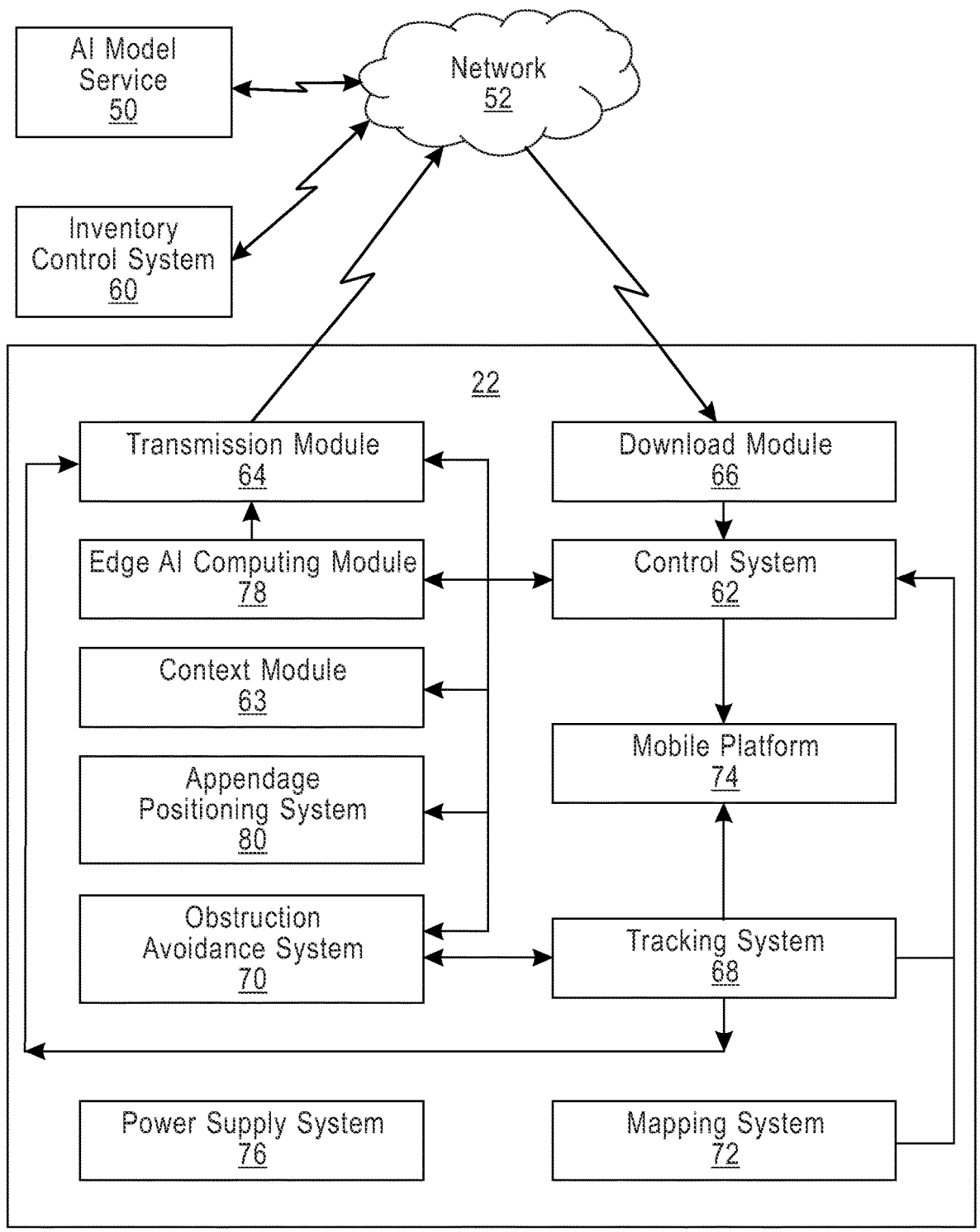
FIG. 8 is a block diagram of one embodiment of a processing system of an automatic inventory counting system disclosed in this specification.

In one embodiment, as shown in FIG. 8, the processing system 22 includes a control system 62, a context module 63, a transmission module 64, a receiver module 66, a tracking system 68, an obstruction avoidance system 70, a mapping system 72, a mobile platform 74, a power supply system 76, an edge AI computing module 78 and an appendage positioning system 80. The power supply system 76 comprises a rechargeable battery that provides power to the mobile inventory robot 12 and a docking port for charging the battery, which can be recharged by docking the inventory robot 12 with a stationary power docking station (not shown).

In one embodiment, the context module 63 determines the context of the robot 12 based on the robot's position in the store floor plan and which types of products are stored in each aisle. In one embodiment, context module 63 determines the context by user input. In one embodiment, the edge AI computing module 78 uses location and other context information to dynamically select and use the suitable AI models from the AI model service 50 for detection and counting depending on the context. In one embodiment, the edge AI computing module 78 downloads a context model 58 from the AI Model Service 50 that will be used to predict the context of the robot 12. In one embodiment, the transmission module 64 transmits the selection of the context specific models to the AI model service 50. The download module 66 downloads the selected context specific modules from the AI model service 50. The control system 62 controls movement of the mobile inventory robot 12 along an inventory map stored in the mapping system 72 using feedback provided by the tracking system 68. The tracking system 68 tracks the position of the mobile inventory robot 12 within a building such as a retail store. In one embodiment, tracking system 68 uses feedback from tracking tags such as retro-reflective tags on the ceiling of the building and infrared waypoints placed in the floor of the building. The control system 62 further controls movement of the mobile inventory robot 12 using the obstruction avoidance system 70 that detects obstructions in the path of the mobile inventory robot 12, including people, shopping carts, boxes of items to be stacked on shelves, and floor displays. In one embodiment, ultrasonic range finders on the robot 12 emit and receive ultrasonic signals, allowing the mobile inventory robot 12 to detect and avoid obstacles. The mobile platform 74 comprises a motor, the mobile drive portion 16 and the wheels 18.

The inventory map stored in the mapping system 72 further comprises an inventory plan that defines an order in which shelves and items in shelves are imaged and counted. As the mobile inventory robot 12 traverses the inventory map, images of items on shelves are captured in a predetermined order; this predetermined order is the inventory plan.

Figure 9:
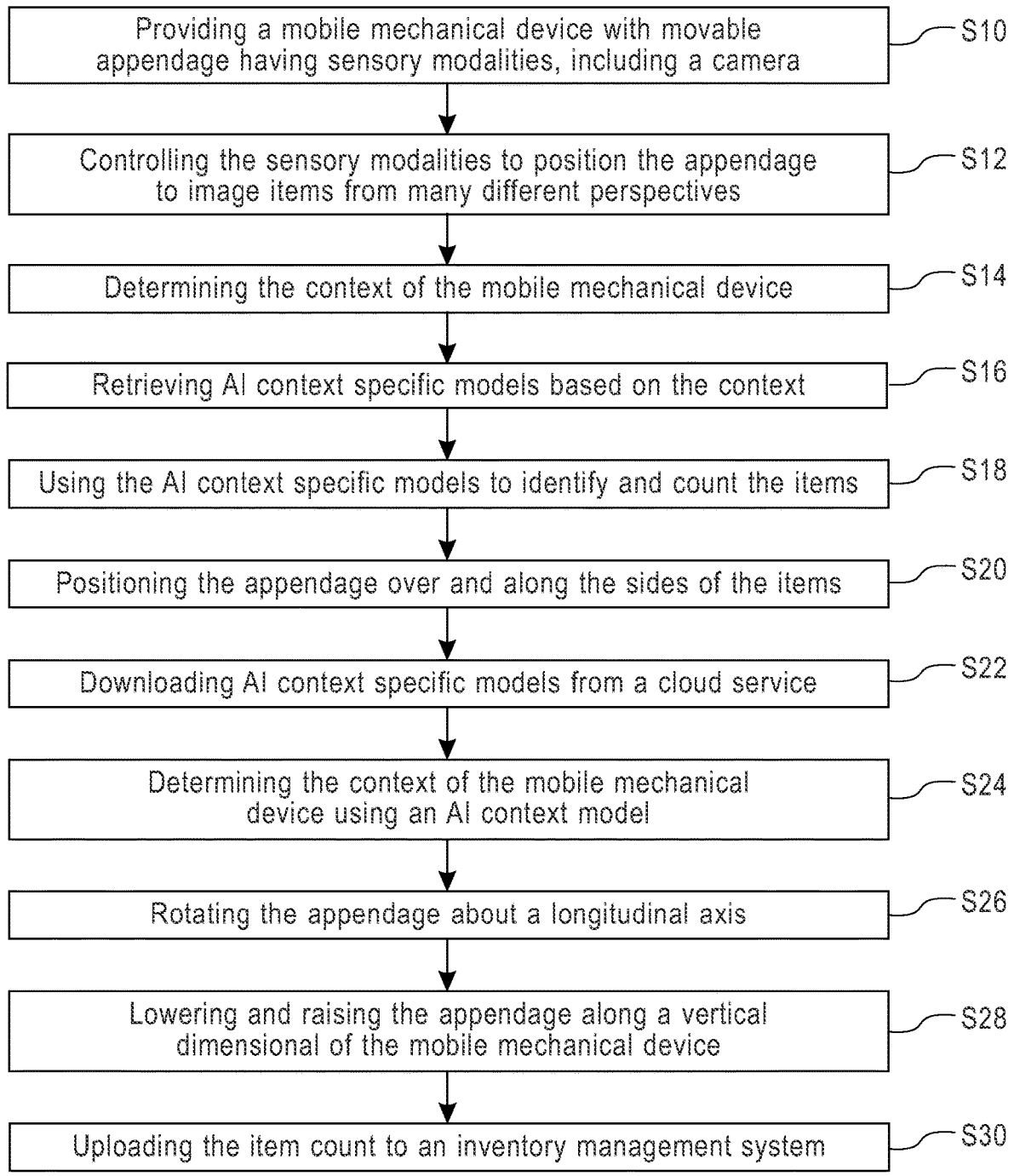
FIG. 9 is a flow diagram of one embodiment of the method disclosed in this specification.

FIG. 9 is a flow chart of one embodiment of a method for automating inventory procedures for items stored on shelves in a closed environment. The method includes the step S10 of providing a mobile mechanical device with movable appendage having sensory modalities, including a camera, step S12 of controlling the sensory modalities to position the appendage to image items from many different perspectives, step S14 of determining the context of the mobile mechanical device, step S16 of retrieving AI context specific models based on the context and step S18 of using the AI context specific models to identify and count the items. In some embodiments, the method may also include one or more of step S20 of positioning the appendage over and along the sides of the items, step S22 of downloading AI context specific models from a cloud service, step S24 of determining the context of the mobile mechanical device using an AI context model, step S26 of rotating the appendage about a longitudinal axis, step S28 of lowering and raising the appendage along a vertical dimensional of the mobile mechanical device and step S30 of uploading the item count to an inventory management system.

In some embodiments, the AI model service 50 and/or the central inventory management service 60 are implemented using cloud computing. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 10:
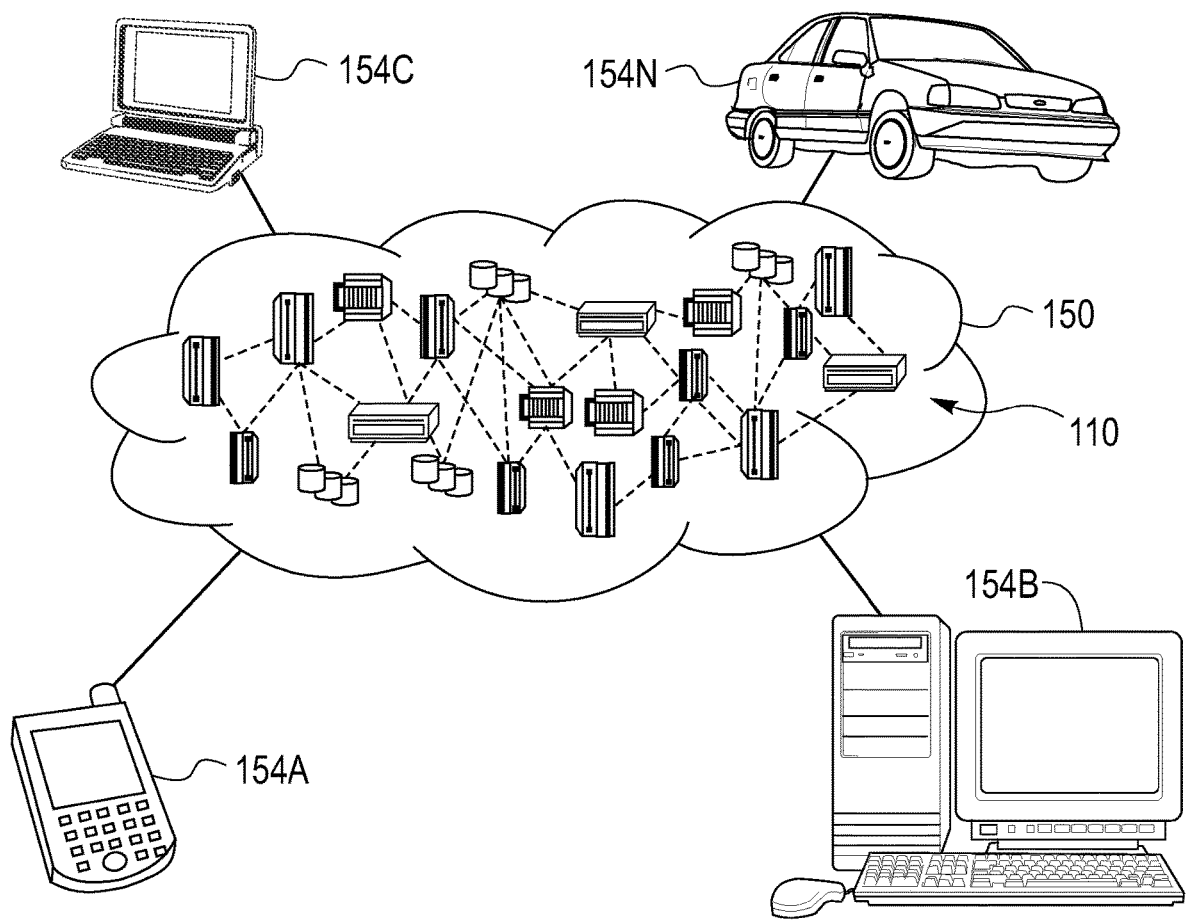
FIG. 10 depicts a cloud computing environment according to an embodiment of the present invention.

Referring now to FIG. 10, illustrative cloud computing environment 150 is depicted. As shown, cloud computing environment 150 includes one or more cloud computing nodes 110 with which local computing devices used by cloud consumers, such as, for example, personal digital assistant (PDA) or cellular telephone 154A, desktop computer 154B, laptop computer 154C, and/or automobile computer system 154N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 154A-N shown in FIG. 10 are intended to be illustrative only and that computing nodes 110 and cloud computing environment 50 can communicate with any type of computerized device over any type of network and/or network addressable connection (e.g., using a web browser).

Figure 11:
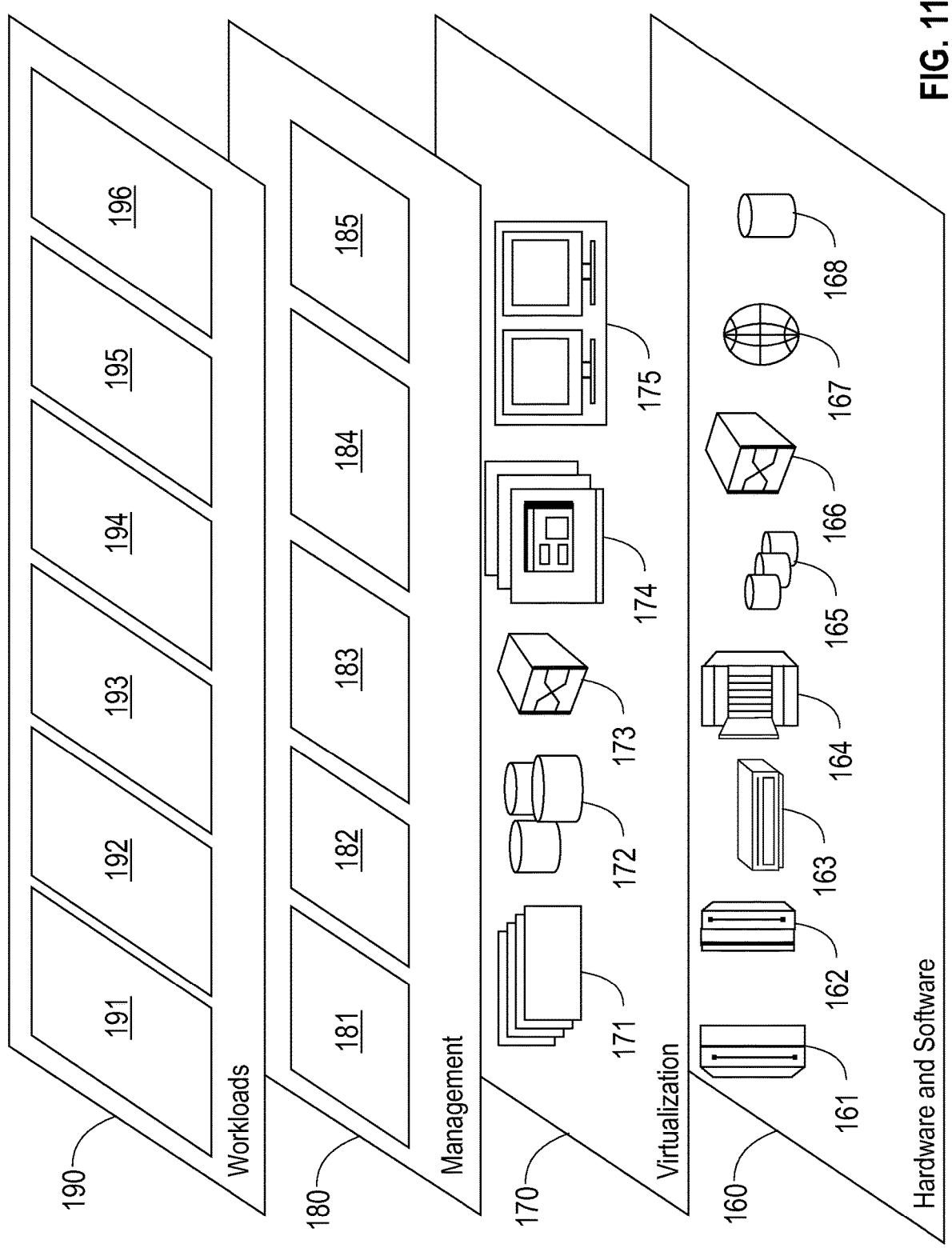
FIG. 11 depicts abstraction model layers according to an embodiment of the present invention.

Referring now to FIG. 11, a set of functional abstraction layers provided by cloud computing environment 150 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 160 includes hardware and software components. Examples of hardware components include: mainframes 161; RISC (Reduced Instruction Set Computer) architecture based servers 162; servers 163; blade servers 164; storage devices 165; and networks and networking components 166. In some embodiments, software components include network application server software 167 and database software 168.

Virtualization layer 170 provides an abstraction layer from which the following examples of virtual entities may be provided: virtual servers 171; virtual storage 172; virtual networks 173, including virtual private networks; virtual applications and operating systems 174; and virtual clients 175.

In one example, management layer 180 may provide the functions described below. Resource provisioning 181 provides dynamic procurement of computing resources and other resources that are utilized to perform tasks within the cloud computing environment. Metering and Pricing 182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 183 provides access to the cloud computing environment for consumers and system administrators. Service level management 84 provides cloud computing resource allocation and management such that required service levels are met. Service Level Agreement (SLA) planning and fulfillment 185 provides pre-arrangement for, and procurement of, cloud computing resources for which a future requirement is anticipated in accordance with an SLA.

Workloads layer 190 provides examples of functionality for which the cloud computing environment may be utilized. Examples of workloads and functions which may be provided from this layer include: mapping and navigation 191; software development and lifecycle management 192; virtual classroom education delivery 193; data analytics processing 194; transaction processing 195; and AI models 96.

Figure 12:
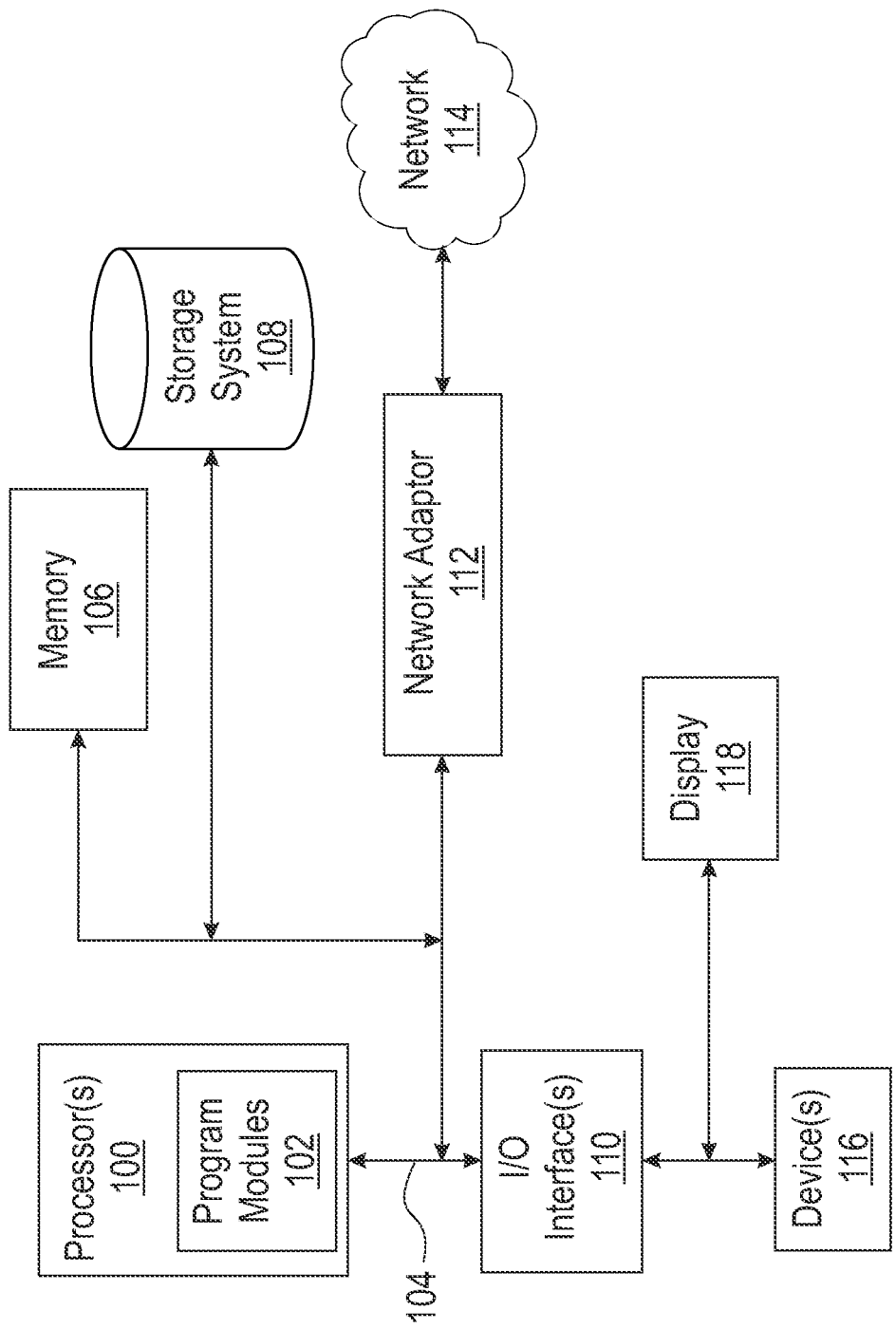
FIG. 12 is a block diagram of an exemplary computing system suitable for implementation of the embodiments of the invention disclosed in this specification.

FIG. 12 illustrates a schematic of an example computer or processing system 22 that may implement the method for automating inventory procedures for items stored on shelves in a closed environment in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. In one embodiment, the processing system 22 in implemented on processors 100 and the program module 102 includes the one or more of the modules shown in FIG. 8. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. An apparatus for automating inventory procedures for products stored on shelves in a closed environment comprising:
   a mobile mechanical device having at least one movable appendage, the at least one movable appendage including at least one camera and at least one additional sensory modality not being a camera;
   a positioning system configured to use the at least one camera and at least one additional sensory modality to position the at least one movable appendage to take camera images of the products on the shelves in the closed environment from a plurality of different perspectives; and
   a computer processing system configured to perform:
      moving the mobile mechanical device to a location in the closed environment;
      positioning the at least one movable appendage and using the at least one additional sensory modality to adjust the position of the at least one movable appendage to take camera images of the products on the shelves at the location from a plurality of different perspectives;
      predicting context of the mobile mechanical device from an artificial intelligence context model;
      selecting a type artificial intelligence model based on the predicted context;
      using the selected type artificial intelligence model to predict the products on the shelf based on the camera images from the at least one camera,
      selecting a counter artificial intelligence model based on the predicted products; and
      using the selected counter artificial intelligence model to count the predicted products on the shelf based on the camera images from the at least one camera.

2. The apparatus of claim 1, wherein the positioning system determines positions to use to take the camera images based on the type of products at the location determined from a floor plan and from signals obtained from the at least one additional sensory modality.

3. The apparatus of claim 1, wherein the computer processing system further configured to perform downloading the selected type artificial intelligence model and counter artificial intelligence model from a cloud hosting service.

4. The apparatus of claim 1, wherein the at least one movable appendage is configured to be rotated about a longitudinal axis of the at least one appendage and lowered and raised along a vertical dimensional of the mobile mechanical device.

5. The apparatus of claim 1, further comprising uploading the product count to an inventory management system.

6. A method for automating inventory procedures for products stored on shelves in a closed environment comprising:
moving a mobile mechanical device to a location in the closed environment, the mobile mechanical device having at least one movable appendage, at least one movable appendage including at least one camera and at least one additional sensory modality not being a camera;
positioning the at least one movable appendage and using the at least one additional sensory modality to adjust the position of the at least one movable appendage to take camera images of the products on the shelves in the closed environment from a plurality of different perspectives;
predicting context of the mobile mechanical device from artificial intelligence context model;
selecting a type artificial intelligence model based on the predicted context;
using the selected type artificial intelligence model to predict the products on the shelf based on the camera images from the at least one camera;
selecting a counter artificial intelligence model based on the predicted products; and
using the selected counter artificial intelligence model to count the predicted products on the shelf based on the camera images from the at least one camera.

7. The method of claim 6, further comprising determining positions to use to take the camera images based on the type of products at the location determined from a floor plan and from signals obtained from the at least one additional sensory modality.

8. The method of claim 6, further comprising downloading the selected type artificial intelligence model and counter artificial intelligence model from a cloud hosting service.

9. The method of claim 6, further comprising rotating the at least one movable appendage about a longitudinal axis of the at least one appendage and lowering and raising the at least one movable appendage along a vertical dimensional of the mobile mechanical device.

10. The method of claim 6, further comprising uploading the product count to an inventory management system.

11. A computer program product comprising:
program instructions on a computer-readable storage medium, where execution of the program instructions using a computer causes the computer to perform a method for automating inventory procedures for products stored on shelves in a closed environment, comprising:
moving a mobile mechanical device to a location in the closed environment, the mobile mechanical device having at least one movable appendage, at least one movable appendage including at least one camera and at least one additional sensory modality not being a camera;
positioning the at least one movable appendage and using the at least one additional sensory modality to adjust the position of the at least one movable appendage to take camera images of the products on the shelves in the closed environment from a plurality of different perspectives;
predicting context of the mobile mechanical device from artificial intelligence context model;
selecting a type artificial intelligence model based on the predicted context;
using the selected type artificial intelligence model to predict the products on the shelf based on the camera images from the at least one camera;
selecting a counter artificial intelligence model based on the predicted products; and
using the selected counter artificial intelligence model to count the predicted products on the shelf based on the camera images from the at least one camera.

12. The computer program product of claim 11, determining positions to use to take the camera images based on the type of products at the location determined from a floor plan and from signals obtained from the at least one additional sensory modality.

13. The computer program product of claim 11, further comprising downloading the selected type artificial intelligence model and counter artificial intelligence model from a cloud hosting service.

14. The computer program product of claim 11, further comprising rotating the at least one movable appendage about a longitudinal axis of the at least one appendage and lowering and raising the at least one movable appendage along a vertical dimensional of the mobile mechanical device.

15. The computer program product of claim 11, further comprising uploading the product count to an inventory management system.

16. A computer system for automating inventory procedures for products stored on shelves in a closed environment, comprising:
one or more computer processors;
one or more non-transitory computer-readable storage media;
program instructions, stored on the one or more non-transitory computer-readable storage media, which when implemented by the one or more processors, cause the computer system to perform the steps of:
moving a mobile mechanical device to a location in the closed environment, the mobile mechanical device having at least one movable appendage, at least one movable appendage including at least one camera and at least one additional sensory modality not being a camera;
positioning the at least one movable appendage and using the at least one additional sensory modality to adjust the position of the at least one movable appendage to take camera images of the products on the shelves in the closed environment from a plurality of different perspectives;
predicting context of the mobile mechanical device from artificial intelligence context model;
selecting a type artificial intelligence model based on the predicted context;
using the selected type artificial intelligence model to predict the products on the shelf based on the camera images from the at least one camera;
selecting a counter artificial intelligence model based on the predicted products; and
using the selected counter artificial intelligence model to count the predicted products on the shelf based on the camera images from the at least one camera.

17. The computer system of claim 16, further comprising downloading the selected type artificial intelligence model and counter artificial intelligence model from a cloud hosting service.

18. A computer system for automating inventory procedures for products stored on shelves in a closed environment comprising:

a mobile mechanical device having a processing system and at least one movable appendage, the at least one movable appendage including at least one camera and at least one additional sensory modality not being a camera;

wherein the processing system comprises:

a positioning system configured to use the at least one camera and at least one additional sensory modality to position the at least one movable appendage to take camera images of the products on the shelves in the closed environment from a plurality of different perspectives;

a computer processing system configured to perform:

moving the mobile mechanical device to a location in the closed environment;

positioning the at least one movable appendage and using the at least one additional sensory modality to adjust the position of the at least one movable appendage to take camera images of the products on the shelves at the location from a plurality of different perspectives;

predicting context of the mobile mechanical device from an artificial intelligence context model;

selecting a type artificial intelligence model based on the predicted context;

using the selected type artificial intelligence model to predict the products on the shelf based on the camera images from the at least one camera, selecting a counter artificial intelligence model based on the predicted products; and using the selected counter artificial intelligence model to count the predicted products on the shelf based on the camera images from the at least one camera;

a cloud service storing the type model and counter model for downloading; and an inventory management system, wherein the computer processing system uploads the product count to the inventory management system.

* * * * *